March 26, 1940.  J. D. SCRAMLIN  2,194,618
COMBINATION FISHING SPEAR AND SPUD EQUIPMENT
Filed Oct. 4, 1938
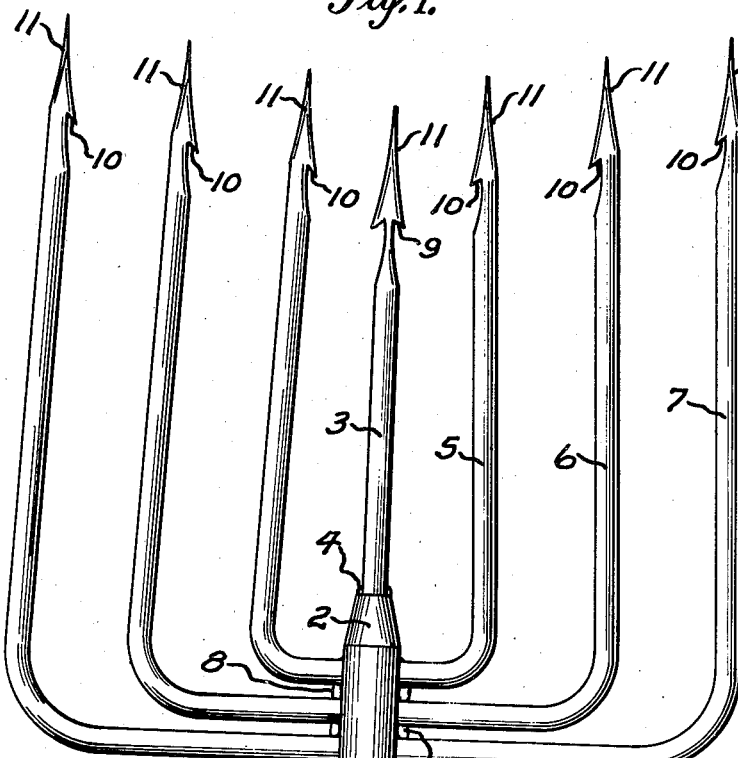
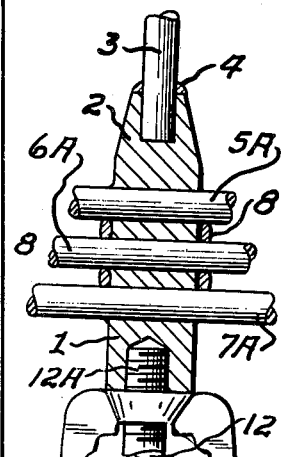
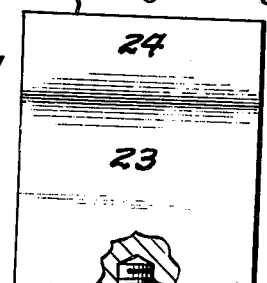
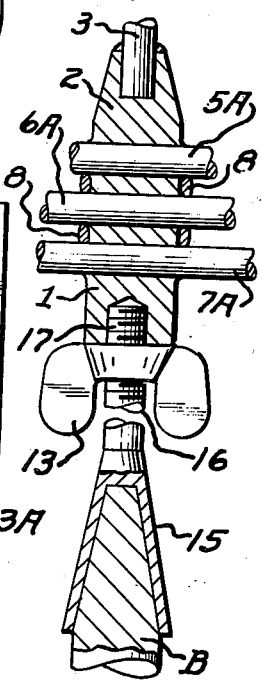
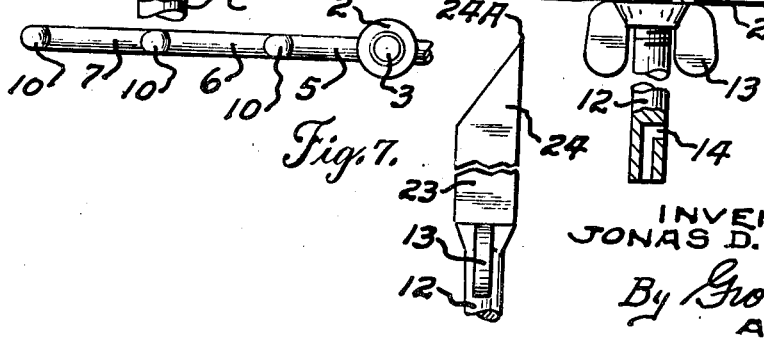
INVENTOR:
JONAS D. SCRAMLIN.
By Grover C. Hill,
ATTORNEY.

Patented Mar. 26, 1940

2,194,618

UNITED STATES PATENT OFFICE 2,194,618

COMBINATION FISHING SPEAR AND SPUD EQUIPMENT

Jonas D. Scramlin, Detroit, Mich.

Application October 4, 1938, Serial No. 233,273

7 Claims. (Cl. 43—6)

The popularity of fishing through the ice in streams, lakes and the like is ever expanding in greater proportions and this form of sport is rapidly becoming an outstanding recreation.

The purpose of this invention is to produce a unified equipment wherein every element required for this sport is provided leaving nothing to be added for successful and enjoyable fishing through the ice.

Among the objects of the invention are those of providing a novel spear head structure which is adapted for spearing muskellunge, perch, pickerel, gar pike, or any other fish that may be legally speared during winter season, securely and without danger of unduly mutilating the fish; to provide an effective chopper head structure for chopping an opening in the ice; to provide a suitable handle including a pullback cord attachment; and to provide novel mounting devices whereby handles of various lengths and spear and chopper heads having varying characteristics may be used.

Another object of the invention is to provide a novel spear head structure including a frog or tine bearing member readily attachable and removable from a handle structure, and a plurality of U-shaped spring steel rod elements having the bases of the U's passed through and secured in the frog and the legs of the U's presented in the form of spearing tines suitably sharpened and provided with relatively small barbs effective for securely holding speared fish but incapable of materially mutilating them, each tine being bent inwardly slightly toward the axis of the frog so that the tines will be spread in contact with a speared fish and thereby press continuously inward to facilitate secure holding of speared fish.

Another object of the invention is to provide a novel means for replaceably mounting the spear tines in the tine bearing frog.

Another object of the invention is to provide novel means for interchangeably attaching handle and fishing accessory head structures.

With the foregoing in mind, it will become readily apparent that the invention possesses further advantages, all of which will be clearly revealed during the course of the following detailed description, illustrated throughout the accompanying drawing, and more fully pointed out in the appended claims.

With reference to the drawing:

Figure 1 is an elevation of the complete spear and certain coordinate elements in connection therewith.

Figure 2 is an enlarged sectional view of the frog unit of the spear.

Figure 3 is a sectional view similar to Figure 2, but showing a portion of one of the handle attachments in connection therewith.

Figure 4 is a front elevation of the chopping member and coordinate elements.

Figure 5 is an enlarged sectional view of a portion of the frog and a partial section of another handle attachment.

Figure 6 is a semi-top plan view of the spear.

Figure 7 is an end elevation of the chopping member, broken as indicated, also attaching elements shown in part.

In Figures 1, 2 and 3 of the drawing I have illustrated a spear head structure including a frog or tine bearing member 1 having exterior tapering portion 2 being counterbored so as to receive one end of central tine 3 which is welded therein as at 4, or this connection may be effected by means of threads if preferred. This head also includes a plurality of U shape tines 5, 6 and 7 the bases 5A, 6A and 7A of which are passed through crossbores in the frog 1 and are welded therein as at 8. In this manner all tines are rigidly secured to frog 1, and being composed of a suitable quality of carbon steel, said tines are free to flex laterally and the entire spear is rendered practically indestructible for the intended purpose.

With special reference to Figure 1 it will be observed that the central tine 3 is provided with double barb 9, while the tines 5, 6 and 7 are each provided with single barbs 10, and all said tines having tapering and pointed ends 11 as indicated. It will be noted also that each tine 5, 6 and 7 is bent slightly inward toward the central tine 3 or the frog axis. Thus when the spear head strikes the hard back of a fish and penetrates the flesh, the outer tines are sprung outwardly and energy is stored up in the spring steel rod structures of the tines serving to continuously press them inwardly for securely holding the speared fish without the necessity of providing long barbs which would unduly mutilate the fish.

For the principal handle, an elongated rod 12 is provided and is preferably composed of drill rod or of some similar metal, and one end of said rod has exterior threads 12A adapted to detachably engage the internally threaded end of the frog or head structure as indicated in Figures 2, 3, 4 and 5 of the drawing. A wing nut 13 is mounted on the rod end 12a and its main body diameter conforms to the diameter of the round end of frog 1 so as to serve as an effective locking means for rod 12 with respect to said frog and to offer a minimum of resistance during movement through the water.

The opposite end of rod 12 is provided with an L shape recess 14, as clearly shown in Figures 1 and 4, and the purpose of said recess is to accommodate a pull back cord A which is double knotted at the respective ends of the recess to thereby securely fasten the cord against displacement in either direction with respect to said rod. The cords A may be of any length desired.

When it is desired to use a wooden handle in connection with the spear, a metal ferrule 15 is provided at the lower end of the rod 16 as shown in Figure 3 from which it will be apparent that the ferrule is detachably secured to the wooden handle B, said rod including the threaded end 17 adapted to detachably engage the frog 1 as indicated. Wing nut 13 is also used so as to lock this connection.

Still another form of ferrule may be provided, as indicated at 18 in Figure 5, and an intermediate rod 19 may also be provided having both ends thereof threaded as at 20 and 21. The ferrule 18 is detachably secured to a wooden handle C by a pin 22 as shown. A wing nut 13 is again used to lock the rod 19 with respect to the frog 1, and it will be observed that this nut not only serves as a lock nut but as previously stated also minimizes resistance while passing through the water.

The novel mounting devices herein described may also be employed to interchangeably mount a chopping head member such as is shown in Figures 4 and 7 and which comprises a body 23 and a bevel portion 24 which terminates in a cutting edge 24A as indicated. The purpose of this chopping head member is to suitably break the ice and permit fishing therethrough and it is provided with internal threads 23A so as to detachably receive the threaded end of the rod 12 and the wing nut 13 by which it is secured in position.

The tines 5, 5A, 6, 6A, 7, 7A being formed of spring steel rods and U-shaped, the base portions thereof adjacent the frog or bearing member 1 and also the leg portions of the U's or the tine bodies proper are yieldable and resilient. Should a tine structure become broken, the spear head can be returned to the factory, the welds 8 can be suitably freed, the intact tine structures turned down out of the way about the axes of the bases 5A, 6A or 7A, and the broken tine structure base can be cut and withdrawn. After the broken tine structure is replaced with a tine rod and the rod is suitably bent, sharpened and barbed, all of the tine structures are again securely welded in place. If desired individual tine structures can be replaced by insertion of preformed half-U structures, thereby avoiding, in some cases, displacement of other unbroken tine structures.

It is necessary to use some form of tool or instrument for cutting through the ice in this form of fishing, and the usual procedure necessitated the use of relatively heavy weight tools, such as a hatchet, hand ax, or the like. The herein disclosed chopping member 23 serves as an efficient tool for this purpose and comprises a small and compact part of the equipment herein disclosed.

Having thus fully described my invention, what I claim as new is:

1. A fishing accessory comprising an interchangeably mounted head structure including a body having a threaded bore therein and a portion shaped to facilitate cleavage, a rod having a threaded end receivable in said bore, and a wing nut on said threaded end and engageable with said body for clamping said body on said rod.

2. A fishing accessory comprising an interchangeably mounted head structure including a body having a threaded bore therein and a portion shaped to facilitate cleavage, a rod having a threaded end receivable in said bore, a wing nut on said threaded end and engageable with said body for clamping said body on said rod, said rod having a bore in its free end and extending through a lateral wall of the rod, and a pull back cord having an end passed through said rod bore and secured therein against withdrawal in either direction by knots tied in the cord.

3. A fishing accessory comprising an interchangeably mounted head structure including a body having a threaded bore therein and a portion shaped to facilitate cleavage, a rod having a threaded end receivable in said bore, a wing nut on said threaded end and engageable with said body for clamping said body on said rod, said body being cylindrical in form and terminating at one end in a water cleaving taper, and said wing nut including a main body portion of no greater diameter than the cylindrical body and streamlined to minimize water resistance.

4. A fish spearing head structure comprising a mounting frog having a small circular transverse bore therethrough, a central tine projecting axially from the frog, and a short barbed U-shaped resilient rod formed tine unit having its base snugly fitting and secured in said transverse bore and each side leg laterally spaced from said central tine whereby to present base portions each resilient adjacent the frog and resilient leg portions opposed to said central tine.

5. A fish spearing head structure comprising a mounting frog having a plurality of axially spaced parallel transverse bores therethrough, and a plurality of barbed U-shaped spring steel rod formed tine units each having its base secured in one of the transverse bores whereby to present resilient base portions laterally of each bore and resilient tine body or leg portions extending in the general direction of the axis of said frog.

6. A fish spearing head structure comprising a cylindrical mounting frog having a plurality of axially spaced parallel transverse bores therethrough and a streamline tapered advance end portion, a double barbed axial tine projecting from said advance end portion, and a plurality of barbed U-shaped spring steel rod formed tine units each having its base secured in one of the transverse bores whereby to present resilient base portions laterally of each bore and resilient tine body or leg portions extending in the general direction of the axis of said frog.

7. A fish spearing head structure comprising a cylindrical mounting frog having a plurality of axially spaced parallel transverse bores therethrough and a streamline tapered advance end portion, a double barbed axial tine projecting from said advance end portion, a plurality of barbed U-shaped spring steel rod formed tine units each having its base secured in one of the transverse bores whereby to present resilient base portions laterally of each bore and resilient tine body or leg portions extending in the general direction of the axis of said frog, a handle rod threadably engaging the end of the frog opposite the advance end, and a wing nut threaded on said rod and having clamping engagement with said frog for securing it on said rod.

JONAS D. SCRAMLIN.